United States Patent
Schütz

(10) Patent No.: US 8,919,562 B2
(45) Date of Patent: Dec. 30, 2014

(54) PALLET-LIKE BASE FRAME FOR TRANSPORT AND STORAGE CONTAINERS FOR LIQUIDS

(75) Inventor: Udo Schütz, Selters (DE)

(73) Assignee: Protechna S.A. (CH)

( * ) Notice: Subject to any disclaimer, the term of this patent is extended or adjusted under 35 U.S.C. 154(b) by 43 days.

(21) Appl. No.: 13/443,974

(22) Filed: Apr. 11, 2012

(65) Prior Publication Data

US 2012/0279898 A1   Nov. 8, 2012

(30) Foreign Application Priority Data

May 4, 2011   (DE) .......................... 10 2011 075 263

(51) Int. Cl.
| | |
|---|---|
| B65D 19/38 | (2006.01) |
| B65D 77/04 | (2006.01) |
| B65D 19/00 | (2006.01) |
| B65D 19/40 | (2006.01) |

(52) U.S. Cl.
CPC ........ B65D 77/0466 (2013.01); B65D 19/0073 (2013.01); B65D 19/40 (2013.01); B65D 2519/00024 (2013.01); B65D 2519/00059 (2013.01); B65D 2519/00094 (2013.01); B65D 2519/00323 (2013.01); B65D 2519/00333 (2013.01); B65D 2519/00373 (2013.01)
USPC .......................................... 206/599; 220/9.4

(58) Field of Classification Search
CPC ............. B65D 19/004; B65D 77/0466; B65D 19/0073; B65D 19/40
USPC ........ 13/599, 386; 220/23.41, 9.4; 108/51.11, 108/53.1, 55.1, 57.32
See application file for complete search history.

(56) References Cited

U.S. PATENT DOCUMENTS

| | | | | |
|---|---|---|---|---|
| 5,191,843 | A | * | 3/1993 | Ausavich et al. ............ 108/56.3 |
| 7,017,499 | B2 | * | 3/2006 | Schutz ........................ 108/51.11 |
| 7,107,912 | B2 | * | 9/2006 | Schutz ......................... 108/55.1 |
| 8,505,721 | B2 | * | 8/2013 | Schutz .......................... 206/386 |
| 2004/0107879 | A1 | | 6/2004 | Schütz |

FOREIGN PATENT DOCUMENTS

| | | |
|---|---|---|
| DE | 9409628 U1 | 9/1994 |
| DE | 202 18 766 U1 | 4/2003 |
| DE | 20316883 U1 | 3/2004 |

(Continued)

OTHER PUBLICATIONS

Japan Patent Office, Notice of Reasons for Rejections, JP 2012-106171, Jun. 4, 2013 (English Translation Only).

(Continued)

*Primary Examiner* — Andrew Perreault
(74) *Attorney, Agent, or Firm* — Quarles & Brady LLP

(57) ABSTRACT

A pallet-like base frame includes corner feet and a floor for supporting an inner container. Central feet made of metal are arranged between the corner feet, and which are attached to a foot frame, to which the floor of the base frame as well as an outer jacket of the inner container are fastened. At least one central foot of the base frame encompasses a profile body, which encompasses a U-shaped cross section, comprising a base wall, an outer journal wall and an inner journal wall, wherein the base wall and the journal walls embody an axial edge web at axial end areas of the profile body in a plane at right angles to a longitudinal axis of the profile body.

10 Claims, 2 Drawing Sheets

(56) References Cited

FOREIGN PATENT DOCUMENTS

| | | | |
|---|---|---|---|
| EP | 1544126 | A1 | 6/2005 |
| EP | 1982924 | A1 | 10/2008 |
| FR | 2213882 | A1 | 8/1974 |
| JP | 2000336768 | A | 12/2000 |
| JP | 2004182346 | A | 7/2004 |
| JP | 2005132493 | A | 5/2005 |

OTHER PUBLICATIONS

European Patent Office, European Search Report, EP 12164905, Sep. 20, 2012.

State Intellectual Property Office of People'S Republic of China, First Office Action, Application No. 201210138040.3, Jan. 30, 2014, 18 pages.

\* cited by examiner

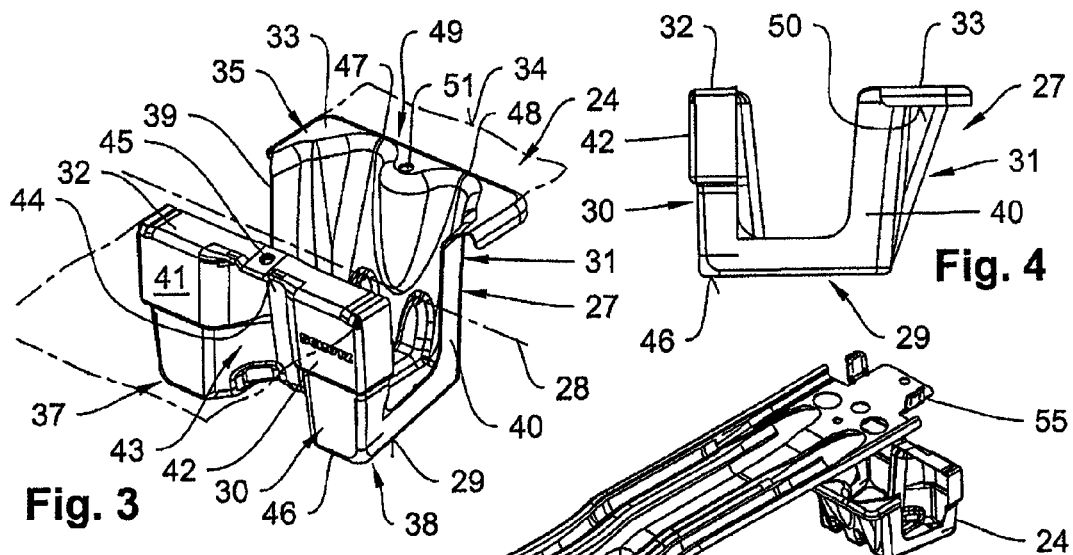
Fig. 3
Fig. 4
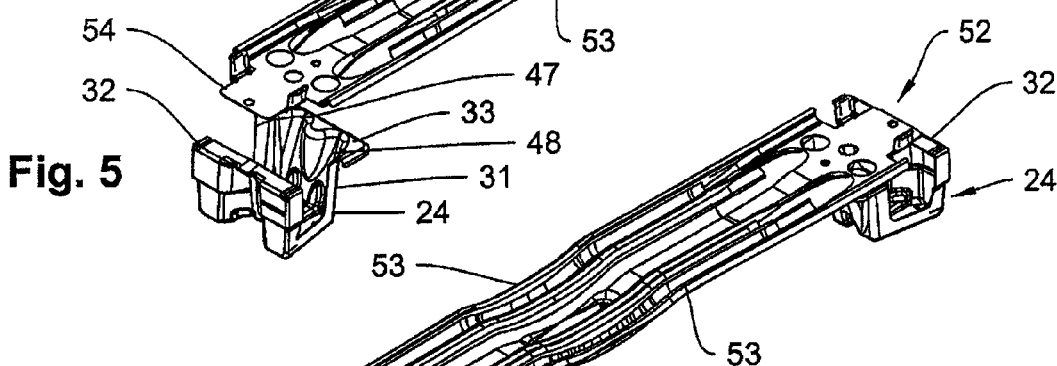
Fig. 5
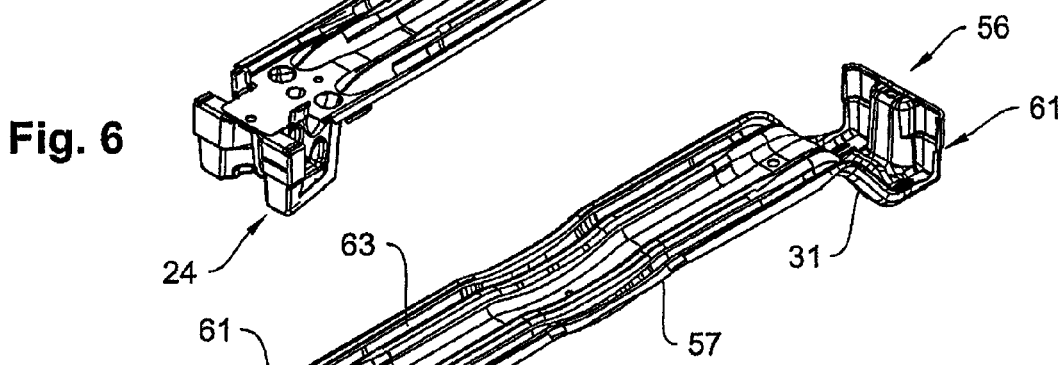
Fig. 6
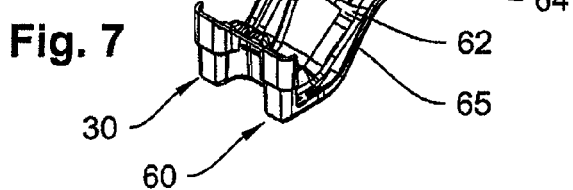
Fig. 7

PALLET-LIKE BASE FRAME FOR TRANSPORT AND STORAGE CONTAINERS FOR LIQUIDS

CROSS REFERENCE TO RELATED APPLICATION

The present application claims the benefit of German Patent Application No. 10 2011 075 263.3 filed May 4, 2011, which is fully incorporated herein by reference.

STATEMENT REGARDING FEDERALLY SPONSORED RESEARCH OR DEVELOPMENT

Not applicable.

FIELD OF THE INVENTION

The instant invention relates to a pallet-like base frame, in particular for transport and storage containers for liquids, which are equipped with an inner container made of plastic, comprising a lockable filler neck and a discharge nozzle for connecting to a removal fitting, as well as an outer jacket made of a metal lattice or metal plate, wherein the base frame encompasses a floor for supporting the inner container, as well as corner feet, and central feet made of metal, which are arranged between the corner feet and which are attached to a foot frame, to which the floor of the base frame as well as the outer jacket of the inner container are fastened.

BACKGROUND OF THE INVENTION

On the one hand, base frames of the afore-mentioned type serve the purpose of providing a manageable platform for storing and for transporting the inner containers, which are made of plastic and which are thus comparatively fragile, by means of suitable forklift devices. Simultaneously, such base frames in combination with the outer jacket serve to protect the inner container against damages. The base frames are to thereby account in particular for the fact that a considerable risk of being damaged exists for the inner containers due to the handling of the transport and storage containers. The pallet-like base frame thus represents a protective shield or protector, which is to absorb in particular impact loads, which can impact the inner container, for example when the transport and storage container hits the floor due to improper handling of the transport and storage container. For this purpose, the base frame must be able to accommodate corresponding applied loads and to still work as handling platform for the liquid container, even after a loading has occurred.

Due to the fact that considerable shear and torsional forces act on the base frame, in particular when the transport and storage container crashes or falls with an asymmetrical impact, thus when the base frame first hits the floor with a corner, the corner and central feet of the base frame have a particular object in response to the accommodation of corresponding applied loads. Due to the fact that the corner feet typically extend across a corner area of the base frame, torsion-resistant embodiments can be realized in a relatively simple manner due to the corresponding multi-axial body shape of the corner feet. On the contrary, a torsion-resistant embodiment of the central feet, which instead extend on a single axis along a foot frame side, turn out to be more problematic.

SUMMARY OF THE INVENTION

The instant invention is thus based on the object of proposing a pallet-like base frame for a transport and storage container for liquids, which encompasses an increased stability, so as to thus make it possible to provide for transport and storage containers for liquids, which ensure an increased safety against storage breakdown caused by a lack of stability of the base frame and which are thus particularly suitable for transporting and storing hazardous material.

To solve this object, the base frame according to the invention includes a floor for supporting an inner container, corner feet, and central feet. The central feet are arranged between the corner feet and attached to a foot frame, to which the floor of the base frame as well as the outer jacket of the inner container are fastened. At least one central foot encompasses a profile body, which encompasses a U-shaped cross section, comprising a base wall, an outer journal wall and an inner journal wall, wherein the base wall and the journal walls embody an edge web at axial end areas of the profile body in a plane at right angles to a longitudinal axis of the profile body.

In the case of the base frame according to the invention, the base wall and the two journals walls, which attach thereto, are thus connected to one another via the edge web such that the central foot encompasses an increased torsion resistance in response to a torsion load about a vertical axis or longitudinal axis. In particular, the edge web leads to a reinforcement of the journals walls relative to one another. Due to the U-shaped embodiment of the edge web, it is nonetheless possible to produce the central foot of the base frame according to the invention from a flat sheet metal blank in a deep-drawing process, because the embodiment of the edge web requires a relatively small amount of material.

It is to be emphasized to be particularly advantageous that the central foot, which is embodied as profile body, encompasses a high inherent stability, so that a stabilization of the shape of the central foot is not first attained by the bond of the central foot to the foot frame or to the floor of the base frame, respectively.

In particular, an embodiment according to the invention of the central foot, which is arranged at the rear side of the container, appears to be advantageous, because this central foot is subjected in a particular manner to the risk of a collision with a fork rake of a forklift device when the forklift device drives under the transport and storage container.

It appears to be particularly advantageous for the connection of the central foot to the floor of the base frame, when, according to a preferred embodiment, the journal walls in each case encompass an upper support edge, which is formed by means of an edge web, which is arranged so as to be angled at the journal walls parallel to the floor of the base frame, wherein the edge webs are arranged in a common support or connecting plane. The arrangement of the edge webs in a common support or connecting plane also considerably simplifies a relative orientation of the floor to the central foot when establishing a connection between the central foot and the floor, because the correct orientation of the central foot to the plane of the floor is already defined by means of the body contact between the edge webs of the journals and the floor.

When, according to a further preferred embodiment, the outer journal wall of the profile body, in its upper area, which faces the floor of the base frame, encompasses a recess, which forms a box-shaped projection—in particular in the manner of a bay arranged at a housing façade—opposite to a lower edge of the journal wall, a further increase of the stiffness of the profile body is attained with simple measures.

When the projection, which is embodied in a box-shaped manner, extends into the axial edge web, the edge web is also included to an increased extent in the stiffness-promoting measure.

On principle, a bay-shaped embodiment of the projection at the journal wall also offers the advantage that an offset is realized between the upper edge of the outer journal wall and the lower edge thereof in the transition to the base wall, thus that the central foot is adapted to the dimensions of the foot frame in a particular manner, which typically encompasses a smaller diameter than the floor of the base frame, so as to realize an ability to stack the transport and storage containers.

When the inner journal wall encompasses a reinforcement seam, which is located opposite the box-shaped projection of the outer journal wall and extends from the upper edge web of the inner journal wall to the base wall and is oriented outwardly, a further measure for increasing the stiffness of the profile body is realized on the one hand. On the other hand, the reinforcement seam, which is oriented outwardly, forms a type of deflecting edge, which supports a deflection or rebounding of the fork rake from the central foot in response to an impact of a fork rake of a forklift device when a forklift device drives under the transport and storage container, so that the danger of damages to the base frame or the central foot, respectively, by the collision with a fork rake of a forklift device is reduced.

It is particularly advantageous when the upper edge web of the inner journal wall projects beyond the base wall towards an inner space of the base frame and the reinforcement seam runs so as to be tilted towards the upper edge web, so that the central foot reinforces the floor of the base frame in a special manner by means of the projecting embodiment of the reinforcement seam.

In particular when the box-shaped projection in the outer journal wall is embodied two-fold such that two box projections, which are in each case embodied in the axial end areas of the journal wall and which extend into the axial edge web, are separated from one another by a recess in the journal wall, the recess provides for an exposed arrangement of the edge webs between the box projections, so that a good accessibility of the edge web is realized for a fastening to the floor of the base frame.

A correspondingly exposed embodiment of the edge web of the inner journal wall becomes possible when a reinforcement seam is in each case embodied opposite to a box-shaped projection, so that a space for a connection between the edge web and the floor of the base frame is possible between the reinforcement seams.

When two central feet, which are located opposite one another, encompass one profile body and the edge webs of the inner journal walls of the profile bodies are connected to one another via a floor cross member, two central feet, which are located opposite one another, can be reinforced directly with one another and can thus embody a reinforcement bridge for the floor of the base frame.

It is particularly advantageous when the inner journal walls of the profile bodies of the central feed embody the floor cross member so as to merge with one another in one piece, so that the central feet and the floor cross member embody a single joined component.

BRIEF DESCRIPTION OF THE DRAWINGS

A preferred embodiment will be defined in more detail below by means of the drawings.

FIG. 3 shows an isometric individual illustration of a central foot;

FIG. 4 shows a side view of the central foot illustrated in FIG. 3;

FIG. 5 shows two central feet prior to the connection thereof to a floor cross member;

FIG. 6 shows the central feet, which are connected to the floor cross member for embodying a reinforcement bridge; and FIG. 7 shows a reinforcement bridge, which is embodied in one piece, with integrally embodied central feet

DETAILED DESCRIPTION OF THE EXAMPLE EMBODIMENTS

Figure 1:
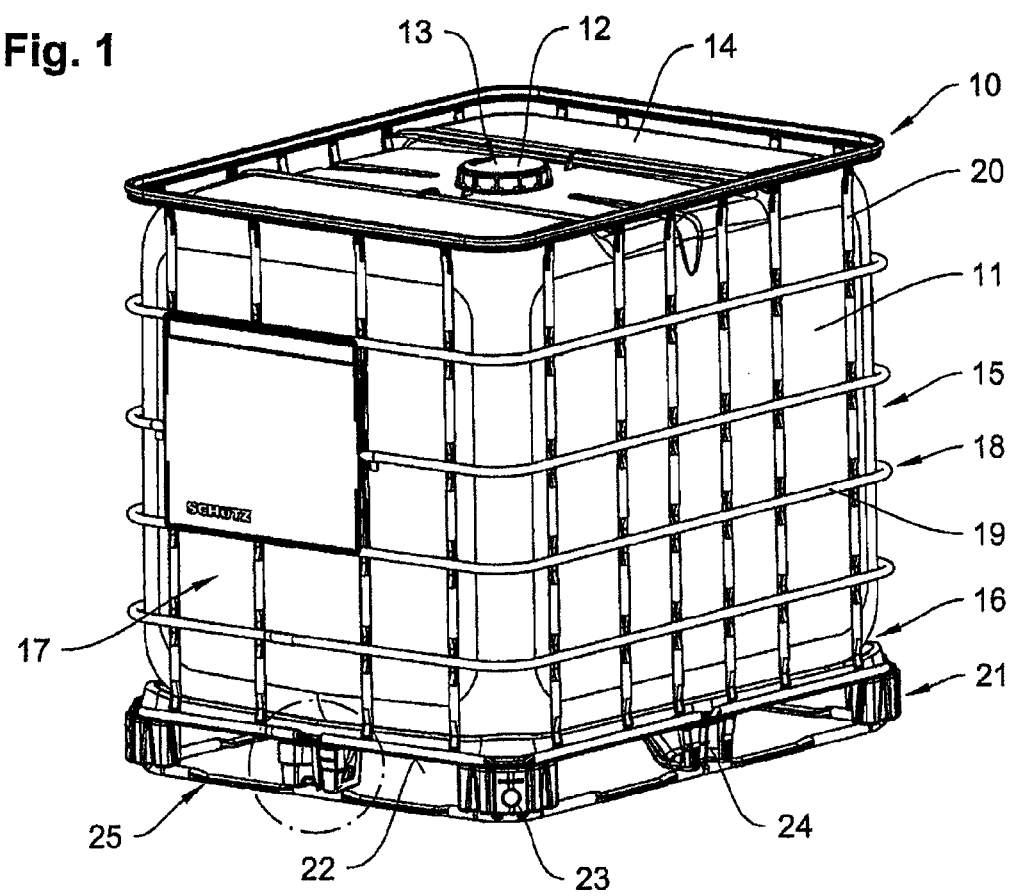
FIG. 1 shows a perspective illustration of a transport and storage container for liquids, which is equipped with a pallet-like base frame.

FIG. 1 shows a transport and storage container 10 for liquids, which can be used as a disposable and reusable container, comprising an inner container 11 made of plastic, which encompasses a filler neck 13, which can be locked by means of a lid 12 in the upper container floor 14 and, at a container front side 15 in the area of a lower container floor 16, a discharge nozzle, which is not visible herein, which serves to connect a removal fitting. The inner container 11 is accommodated so as to be capable of being replaced in an outer jacket 18 of intersecting horizontal and vertical lattice bars 19, 20 made of metal, which, just as the inner container 11, is arranged on a pallet-like base frame 21.

The base frame 21 encompasses a floor 22 for supporting the inner container 11 as well as corner feet 23 and central feet 24, which are attached to a foot frame 25, and to which the floor 22 as well as the outer jacket 18 of the inner container 11 are fastened.

Figure 2:
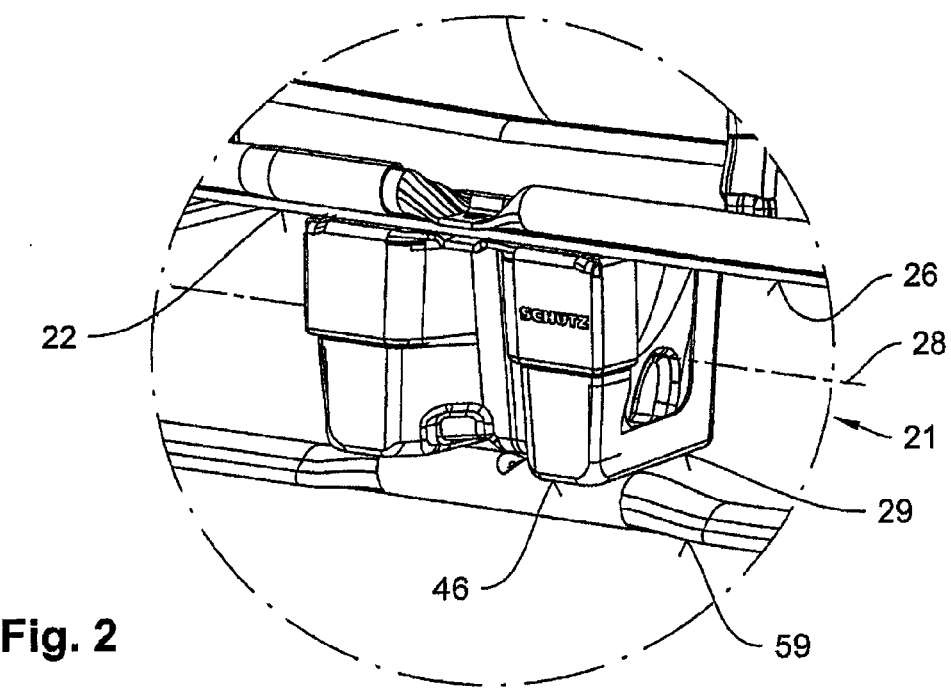
FIG. 2 shows an enlarged illustration of the base frame in the area of a central foot.

FIG. 2 shows a central foot 24, which is arranged on a rear side of the container 17 (FIG. 1) between two corner feet 23 and which extends between a foot frame tube 59 and a peripheral edge 26 of the floor 22 and which thus supports the floor 22 of the base frame 21 opposite to the foot frame tube 25.

As becomes clear in particular from a combined view of FIGS. 3 and 4, the central foot 24 encompasses a profile body 27, which is formed in one piece from a sheet metal blank and which, as can be seen in particular from FIG. 4, encompasses a U-shaped cross section based on a longitudinal axis 28 of the profile body 27 extending parallel to the foot frame tube 59 (FIG. 2). The profile body 27 is comprised of a base wall 29 and journal walls 30, 31 arranged thereon, wherein the journal wall 30 on the left in FIG. 4 will hereinbelow be identified as outer journal wall 30 in accordance with its relative arrangement at the base frame 21 illustrated in FIG. 2, and the journal wall 31, which is illustrated on the right in FIG. 4, will hereinbelow be identified as inner journal wall 31 in accordance with its relative arrangement at the base frame 21.

At their upper edge, both journal walls 30, 31 encompass a edge web 32 or 33, respectively, which is arranged so as to be angled, which are arranged in a common support plane 34 and which together form a support surface 35, with which the central foot 24 is supported on the floor 22 of the base frame 21 (FIG. 2). This support on the floor 22 can take place directly, so that the edge webs 32, 33 thus abut directly on the bottom side of the floor 22 or indirectly, wherein, as is illustrated in particular in FIG. 6, a floor cross member 53, which connects two central feet 24 located opposite one another to one another, rests on the edge webs 32, 33 and the connection of the central feet 24 to the floor 22 is carried out via an arrangement of the floor cross member 53 located therebetween.

As is shown in particular in FIG. 3, the profile body 27 encompasses, at its axial end areas 37, 38, axial edge webs 39 or 40, respectively, which are arranged so as to be angled to the base wall 23 and the journal walls 30, 31 and which, in the case of the instant exemplary embodiment, are also embodied so as to be U-shaped and reinforce the journal walls 30, 31 relative to one another. On the side of the outer journal wall 30, the axial edge webs 39, 40 merge into the edge web 32, which is embodied at upper edge of the journal wall 30. On the side of the inner journal wall 31, the axial edge webs 39, 40 continue into the edge web 33, which is embodied at the upper edge of the inner journal wall.

As can be seen in particular from FIG. 3, the outer journal wall 30 encompasses, in the axial end areas 37, 38 of the profile body 27, moldings, which are oriented outwards and which encompass approximately the embodiment of a bay, which is embodied at a housing façade and which will be identified hereinbelow as wall bays 41, 42. The wall bays 41, 42 are embodied so as to be box-shaped and extend into the axial edge webs 39, 40. Due to the axial spacing of the wall bays 41, 42 from one another, a recess 43 is embodied between the wall bays 41, 42. A bottom side 44 of the edge web 32 is arranged so as to be exposed by means of the recess 43, so that a fastening opening 45, which can be accessed well and which provides for a feed-through of a connecting element, for example a screw, for connecting the edge web 32 to the floor 22, is embodied in the area of the recess 43.

As is further shown in FIGS. 3 and 4, the wall bays 41, 42 tower above the base wall 29 of the profile body 27 towards the outside, so that a connecting edge 46 of the base wall 29, which, as shown in FIG. 2, serves for the connection to the foot frame tube 59, is accordingly moved back inwards opposite the edge web 32, which serves for the connection to the peripheral edge 26 of the floor 22.

FIG. 3 shows that reinforcing moldings, which will be identified hereinbelow as reinforcement seams 47, 48, are in each case embodied in the inner journal wall 31 opposite to the wall bays 41, 42, which are embodied in the outer journal wall 30. A recess 49, which is oriented towards the longitudinal axis 28 of the profile body 27, is embodied between the reinforcement seams 47, 48 below the edge web 33 such that a bottom side 49 of the edge web 33 can be accessed and a fastening opening 51, which, analogous to the fastening opening 45 in the edge web 32, provides for the feed-through of a connecting element for connecting the edge web 33 to the floor 22, is embodied in the edge web 33 in the area of the recess 49.

As already mentioned above, it is possible to connect the central foot 24 directly to the floor 22, as is the case in the case of the central foot 24 illustrated in FIG. 1, which is arranged at the rear side of the container 17 at the base frame 21, or to connect two central feet 24, which are located opposite one another, thus two central feet 24, which are located at opposite container sides of the base frame 21, for embodying a reinforcement bridge 52 illustrated in FIG. 6 to the floor cross member 53, which runs along the bottom side of the floor 22 so as to reinforce it. A supporting arrangement of the floor cross member 53 with its connecting end areas 54, 55 on the edge webs 32, 33 of the central feet 24, which are located opposite one another, thus takes place with this, as can also be seen from FIGS. 5 and 6. It becomes clear thereby that, due to the inwardly tilted orientation of the reinforcement seams 47, 48 in the inner journal walls 31 of the central feet 24, a transition between the journal walls 31 and the floor cross member 53, which is favorable with reference to the application of force, as well as an effect, which increases the bending strength of the journal walls 31 is attained.

As an alternative to the embodiment of the reinforcement bridge 52 illustrated in FIG. 6, FIG. 7 shows a reinforcement bridge 56, in the case of which central feet 60 are embodied integrally with a floor cross member 57. In particular, reinforcement seams 61, 62, which are embodied in inner journal walls 65 of the central feet 60, continuously merge into reinforcement seams 63, 64 of the floor cross member 57, which run in longitudinal direction of the floor cross member 57.

A comparison of the embodiments of the reinforcement bridges 52 and 56 illustrated in FIGS. 6 and 7 shows that, contrary to the reinforcement bridge 52, the journal walls 65 of the central feet 60, which are arranged opposite one another, are embodied so as to continuously merge with one another, instead of the edge webs 33, which are in each case embodied separately at the inner journal walls 31.

The invention claimed is:

1. A pallet base frame for transport and storage containers equipped with an inner container and an outer jacket, said inner containing having a lockable filler neck and a discharge nozzle for connecting a removal fitting, said base frame comprising:
 a floor for supporting the inner container;
 a foot frame fastened to the floor;
 corner feet: and
 metal central feet arranged between the corner feet and attached to the foot frame, wherein at least one central foot of the central feet includes a profile body having a U-shaped cross section, said profile body including a base wall, an outer wall and an inner wall, wherein the base wall and the inner and outer walls include an axial edge web at axial end areas of the profile body in a plane at right angles to a longitudinal axis of the profile body, each of said inner and outer walls further including an upper support edge formed by an edge web arranged so as to be angled at the inner and outer walls parallel to the floor, wherein the edge webs are arranged in a common support plane.

2. The base frame according to claim 1, in which the outer wall, in its upper area, which faces the floor of the base frame, encompasses a recess, which forms a box-shaped projection opposite a lower edge of the outer wall.

3. The base frame according to claim 2, in which the box-shaped projection extends into the axial edge web.

4. The base frame according to claim 2, in which the inner wall encompasses an outwardly oriented reinforcement seam located opposite the box-shaped projection of the outer wall and extending from the upper edge web of the inner wall to the base wall.

5. The base frame according to claim 4, in which the upper edge web-of the inner wall projects beyond the base wall towards an inner space of the base frame, and the reinforcement seam runs so as to be tilted towards the upper edge web.

6. The base frame according to claim 2, in which the box-shaped projection in the outer wall is includes two projections, which are in each case embodied in the axial end areas of the wall and which extend into the axial edge web, are separated from one another by a recess.

7. The base frame according to claim 6, in which the inner wall in each case encompasses a reinforcement seam opposite a box-shaped projection.

8. The base frame according to claim 1, in which two of the central feet located opposite one another encompass one profile body and the edge webs of the inner walls of the profile bodies are connected to one another via a floor cross member.

9. The base frame according to claim 8, in which the inner walls of the profile bodies of the central feet include the floor cross member so as to merge with one another in one piece.

10. A transport and storage container for liquids, said container comprising;
   the pallet base frame according to claim 1;
   a plastic inner container arranged on the floor of the pallet base frame and including a lockable filler neck and a discharge nozzle for connecting a removal fitting; and
   an outer jacket made of a metal lattice or metal plate arranged on the floor.

\* \* \* \* \*